(12) United States Patent
Rumbley, Jr.

(10) Patent No.: US 11,000,724 B1
(45) Date of Patent: May 11, 2021

(54) BARBELL WEIGHT PLATE SECURING STRAP

(71) Applicant: Billy Chuck R. Rumbley, Jr., Tuscumbia, AL (US)

(72) Inventor: Billy Chuck R. Rumbley, Jr., Tuscumbia, AL (US)

( * ) Notice: Subject to any disclaimer, the term of this patent is extended or adjusted under 35 U.S.C. 154(b) by 0 days.

(21) Appl. No.: 16/023,173

(22) Filed: Jun. 29, 2018

Related U.S. Application Data

(60) Provisional application No. 62/526,594, filed on Jun. 29, 2017.

(51) Int. Cl.
*A63B 21/072* (2006.01)

(52) U.S. Cl.
CPC ...... *A63B 21/0728* (2013.01); *A63B 21/0724* (2013.01); *A63B 21/0726* (2013.01)

(58) Field of Classification Search
CPC ....... A63B 21/072–075; A63B 2244/09; F16B 2/08; Y10T 24/1498; Y10T 24/1406; A61F 5/0123; A61F 5/0125; A61F 5/0106; A61F 5/0109; A61F 5/02; A61F 5/022; A61F 5/024; A61F 5/026; A61F 5/028; A61F 9/027; A61F 2013/00489; A61F 13/64; B65D 63/1027; B65D 63/1018; B65D 75/02
USPC ...................... 128/876; 602/75–76; 604/402
See application file for complete search history.

(56) References Cited

U.S. PATENT DOCUMENTS

| | | | | |
|---|---|---|---|---|
| 441,693 A | * | 12/1890 | McElroy | B65D 63/1018 24/17 A |
| 535,502 A | * | 3/1895 | Knighton | B65D 63/10 24/16 R |
| 2,936,980 A | * | 5/1960 | Rapata | F16L 3/12 24/16 PB |
| 3,059,359 A | * | 10/1962 | Goldammer | G09F 3/005 40/633 |
| 3,169,004 A | * | 2/1965 | Rapata | F16B 2/08 248/71 |
| 3,233,801 A | * | 2/1966 | Schulenberg | A44C 5/2071 224/176 |
| 3,601,863 A | * | 8/1971 | Dorsey | B65D 63/16 24/16 PB |

(Continued)

OTHER PUBLICATIONS

PCT Notification of Transmittal of the International Search Report and the Written Opinion of the International Search Authority, or the Declaration; 12 pgs; dated Apr. 15, 2019.

*Primary Examiner* — Megan Anderson
*Assistant Examiner* — Kathleen Vermillera
(74) *Attorney, Agent, or Firm* — Lanier Ford Shaver & Payne, PC; Gerald M. Walsh

(57) ABSTRACT

A weight plate securing strap having a strip with a first end and a second opposite end. A post is on the first end and a plurality of apertures are near the second opposite end, wherein, when the strap is curved so that the post on the first end is inserted into an aperture near the second opposite end, the strap forms a circular collar for a weight plate on a barbell and wherein the strip is stretchable, made of rubber, or is rubber-like. A gripping flap on the first end and on the second opposite end facilitate installation of the strap around a barbell. The nature of the rubber or rubber-like texture of the strap and its being wound and stretched around the barbell creates a high resistance to movement along the length of the barbell.

5 Claims, 3 Drawing Sheets

(56) References Cited

U.S. PATENT DOCUMENTS

| | | | |
|---|---|---|---|
| 4,817,944 A | | 4/1989 | Anderson et al. |
| 4,874,151 A | | 10/1989 | Fritz |
| 9,662,530 B2 | * | 5/2017 | Dimitrov ............ A63B 21/0728 |
| 10,039,949 B2 | * | 8/2018 | Brasch ............... A63B 21/0728 |
| 2016/0356293 A1 | | 12/2016 | Dimitrov |
| 2016/0375295 A1 | | 12/2016 | Brasch |

* cited by examiner

BARBELL WEIGHT PLATE SECURING STRAP

CROSS-REFERENCE TO RELATED APPLICATIONS

This application claims priority to U.S. Provisional Patent Application No. 62/526,594, entitled Weight Securing Apparatus, filed on Jun. 29, 2017, naming Chuck Rumbley as an inventor, the contents of that application being incorporated herein by reference in its entirety.

FIELD OF THE INVENTION

The present invention relates generally to the field of weight training devices such as barbells and dumbbells that use removable weight plates secured with collars and, more particularly, to barbell weight plate securing straps.

BACKGROUND

Weightlifting is a past time that often requires barbells to perform certain exercises. A barbell is equipment used in weightlifting that comprises a long bar or shaft that is typically metal. Heavy adjustable, removeable weight plates having central apertures therein are positioned over each end of the barbell. Once attached, a weightlifter can perform exercises by, for example, lifting the barbell in any number of different exercises.

There are various ways of securing the weight plates to the barbell. There are quicklee collars that are approximately 3-inch-long metal or plastic tubes that have a slightly narrower tube therein. With a quicklee collar, the weightlifter pulls an outer layer of the tube away from an inner layer and slides the collar on to the end of the barbell.

There are also spin-lock collars that comprise two layers coupled via one or more screws. To secure weights on a barbell using a spin-lock collar, the weightlifter unscrews the two layers so that the collar is loose enough to slide on the end of the barbell.

Clamp collars are pressurized spring coils that secure weights to the barbell. In this regard, a piece of metal is coiled four or five times before branching into two padded prongs. To insert the clamp collar over the end of the barbell to secure the weights, the weightlifter squeezes the prongs on the clamp to loosen the coiled metal, slides the clamp onto an end of the barbell, then releases the prongs, thereby securing the clamp to the barbell. Other collars that may be used include screw-on collars and pressure collars.

Prior art products are heavy and may add a significant amount of weight to the barbell assembly. Current products lack durability and are often made of many small parts that can be lost or broken. Many current products use two or more inches of sleeve length in order to fasten the collar securely, making the entire apparatus bulky. Furthermore, current inventions do not accommodate all sizes of barbell sleeves equally due to the limited range of their clamping force.

SUMMARY OF THE INVENTION

The present invention provides a weight plate securing strap having a strip with a first end and a second opposite end. A post is on the first end and a plurality of apertures are near the second opposite end. When the strap is curved so that the post on the first end is inserted into an aperture near the second opposite end, the strap forms a circular collar for a weight plate on a barbell. The strip is, preferably, stretchable, made of rubber, or is rubber-like. The strip may have a gripping flap on the first end and on the second opposite end to facilitate installing the strap around a barbell.

A method of securing a weight plate to a barbell is also provided. The first end with the post is placed adjacent to a weight plate on a barbell and between the weight plate and an end of the barbell. The second opposite end is wrapped around the circumference of the barbell so that the second opposite end engages the post on the first end. The strip is stretched until a desired aperture reaches the post. The post is inserted into the aperture to form a circular collar to secure the weight plate to the barbell so that the weight plate does not fall off the end of the barbell. The flap on the first end, or on the second end, or on both ends may be gripped to facilitate installing the strap around a barbell. The nature of the rubber or rubber-like texture of the strap and its being wound stretched around the barbell creates a high resistance to movement along the length of the barbell.

There are several advantages to the weight plate securing strap of this invention. The strap is easy and inexpensive to manufacture. It is easy and quick to install and remove. It adds negligible weight to the barbell and does not damage the barbell. The nature of the rubber or rubber-like texture of the strap and its being wound stretched around the barbell creates a high resistance to movement along the length of the barbell. The strap can prevent weight plates at least up to 100 pounds from falling off the end of barbell.

BRIEF DESCRIPTION OF THE DRAWINGS

The disclosure can be better understood referencing the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION OF THE INVENTION

While the following description details the preferred embodiments of the present invention, it is to be understood that the invention is not limited in its application to the details of construction and arrangement of the parts illustrated in the accompanying figures, since the invention is capable of other embodiments and of being practiced in various ways.

This invention relates to a weight plate securing strap that fixedly and removably couples weight plates to a barbell. The strap comprises a flexible, stretchable strip that wraps around the barbell and is adjacent the weight plates that have been placed on the barbell. As an example, the strip may be comprised of flexible material, preferably rubber or rubber-like material. On one end of the flexible strip is a post and on the other end is a series of apertures that go through the flexible strip. In use, a weightlifter wraps the strap around the barbell adjacent the weight plate and inserts the metal post into one of the apertures. The particular aperture through which the weightlifter inserts the post depends upon the diameter of the barbell. Once the strap is in place the weight plate cannot come off the end of the bar bell.

Figure 1:
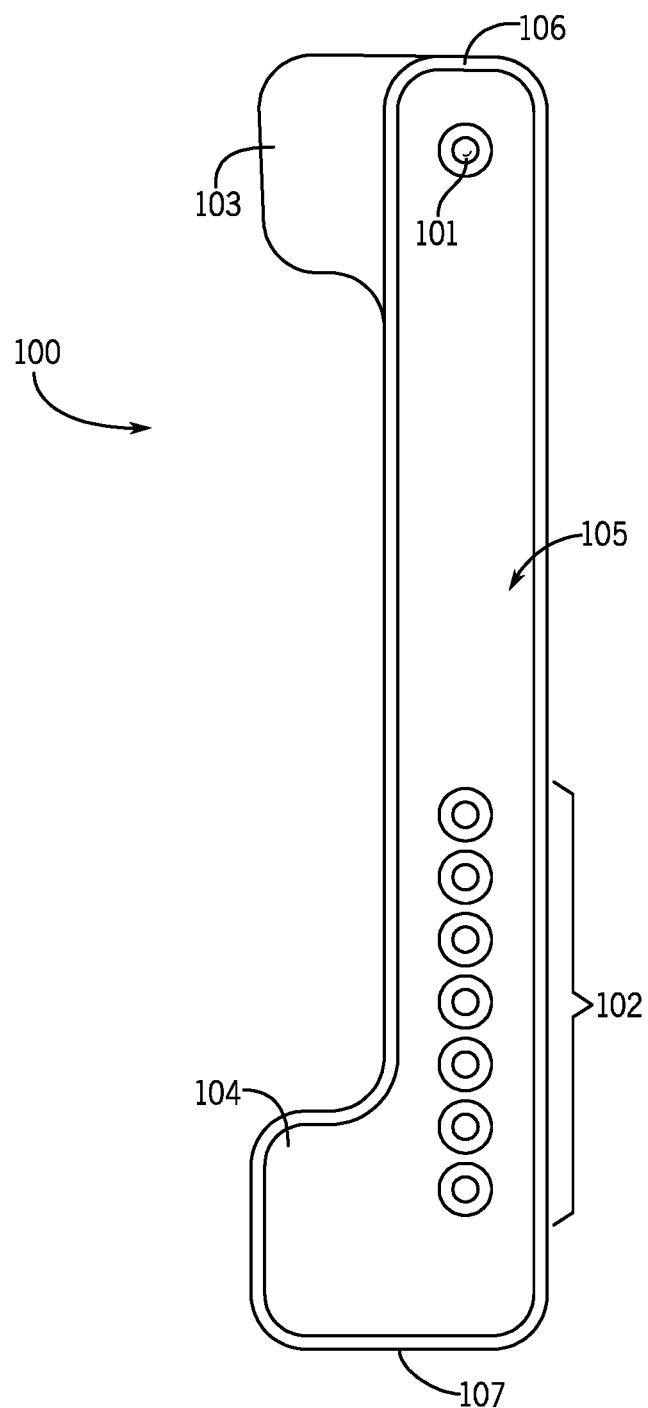
FIG. 1 shows a top perspective view of an exemplary weight plate securing strap in accordance with an embodiment of the present invention.
Figure 2:
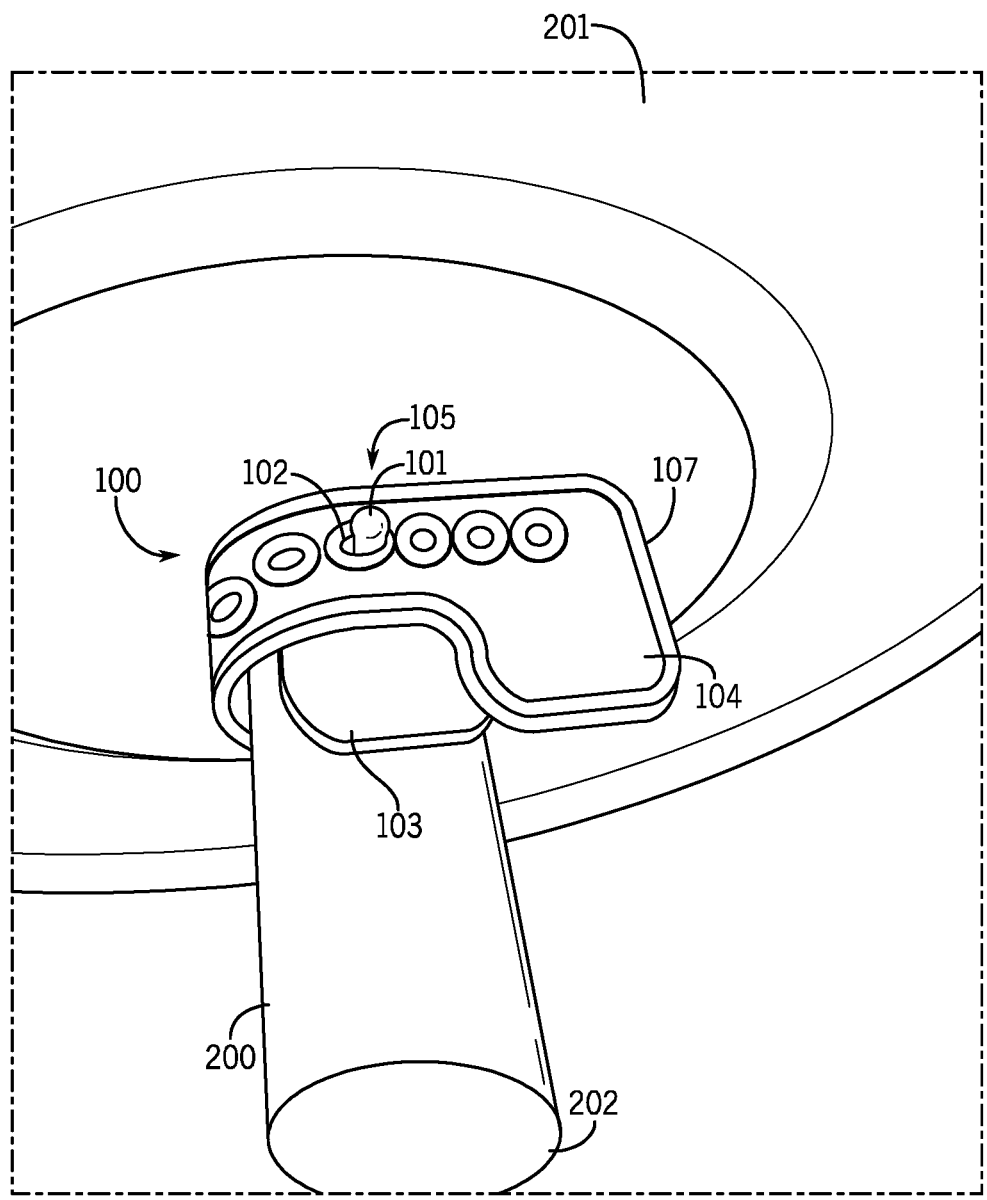
FIG. 2 shows a top perspective view of the flexible weight plate securing strap of FIG. 1 installed near an end of a barbell and securing a weight on the barbell.

FIG. 1 shows a top perspective view an exemplary weight plate securing strap 100 in accordance with an embodiment of the present invention. The weight plate securing strap 100 has a flexible strip 105 that is made of some type of flexible material, e.g., rubber or rubber-like material. The strap 100 has end flaps 103 and 104 on ends 106 and 107 of the strip 105, respectively. The end flaps 103 and 104 are used to grip the ends 106 and 107 to facilitate installing the strap 100 to a barbell adjacent to a weight plate 201 (FIG. 2) on the barbell 200 (FIG. 2). The strip 105 has a post 101 on one end, in this case end 106, of the flexible strip 105. The post 101 is made of a strong material which can be metal or plastic. The post 101 is sized and configured for tight insertion through one of the series of apertures 102 which are located near the opposite end, in this case, end 107.

FIG. 2 shows a top perspective view of the flexible weight plate securing strap 100 installed near an end 202 (see FIG. 3) of a barbell 200 and securing a weight plate 201 on the barbell 200. In use, a weightlifter places the post end 106 (not shown) adjacent to a weight plate 201 on the barbell 200 between the weight plate 200 and the end 202 of the barbell 200. The weightlifter wraps the opposite end 107 of the flexible strip 105 around the circumference of the barbell 200 so that the end 107 engages with the end 106 (not shown). The weightlifter then inserts the post 101 through one of the series of apertures 102 such that the strap 100 remains in place and snugly grasps the barbell 200.

Figure 3:
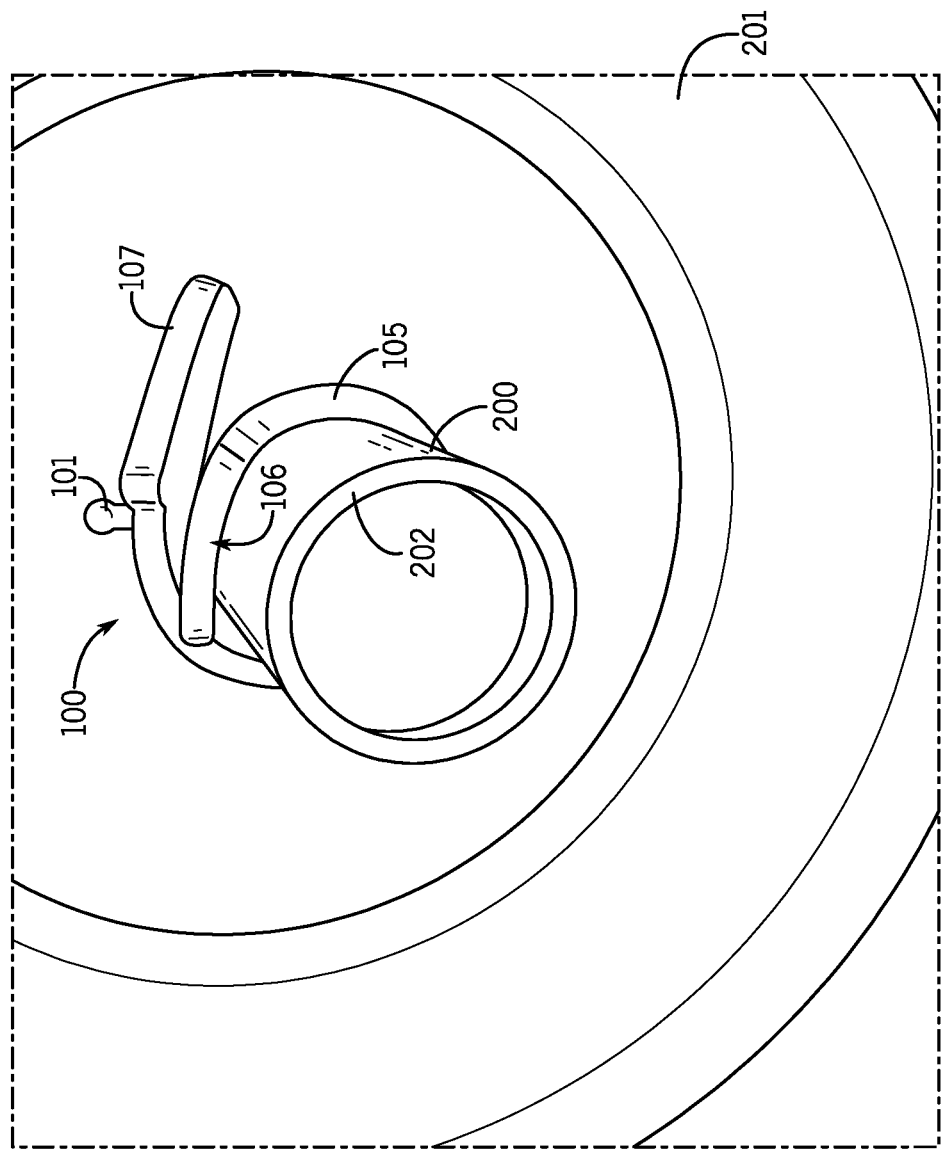
FIG. 3 shows a side perspective view of the weight plate securing strap of FIG. 1 installed about an end of a barbell and securing a weight plate on the barbell.

FIG. 3 shows a side perspective view of the weight plate securing strap 100 installed near an end 202 of a barbell 200 and securing a weight plate 201 on the barbell 200. Notably, the end 106 that comprises the post 101 is placed adjacent the weight plate 201 on the barbell 200, between the weight plate 201 and the end 202 of the barbell 200. The flexible, stretchable strip 105 is wrapped around the circumference of the barbell 200 and stretched until a desired aperture 102 (not shown) reaches the post 101. The post 101 is inserted through the aperture 102, thereby securing the weight plate 201 to the barbell 200 so that the weight plate 201 does not fall off the end 202 of the barbell 200.

Because of the nature of the rubber or rubber-like texture of the strap and its being wound and stretched around the barbell, it creates a high resistance to movement along the length of the barbell. This feature makes it very effective in keeping the weight plate in place on the barbell. When the strap is curved so that the post at one end can be inserted into one of the apertures at the opposite end, the strap forms a circular collar for a weight plate on a barbell.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, the weight plate securing strap can be constructed in any desirable length, width, and thickness to accommodate a barbell. Rubber-like materials can be soft plastics that are processed to be like rubber. The flaps for gripping can be in any desired shape. The term "barbell" also includes the term "dumbbell".

It will be understood that various changes in the details, materials, and arrangements of the parts which have been described and illustrated above in order to explain the nature of this invention may be made by those skilled in the art without departing from the principle and scope of the invention as recited in the following claims.

I claim:

1. A weight plate securing strap, comprising:
    a) a stretchable strip having a first end and a second opposite end;
    b) a post on the first end and a plurality of apertures near the second opposite end, wherein, when the stretchable strip is curved so that the post on the first end is inserted into one of the plurality of apertures near the second opposite end, the stretchable strip forms a circular collar for a weight plate on a barbell; and
    c) a gripping flap at each of the first end and the second opposite end of the stretchable strip, wherein each of the gripping flap facilitate stretching the stretchable strip around the barbell and wherein each of the gripping flaps are on one side of the stretchable strip and extend from the one side of the stretchable strip.

2. The weight plate securing strap of claim 1, wherein stretching the stretchable strip around the barbell with each of the gripping flaps creates a high resistance to movement of the weight plate securing strap along a length of the barbell.

3. The weight plate securing strap of claim 1, wherein each of the gripping flaps is oriented perpendicular to a longitudinal segment of the stretchable strip extending between the first end and the second opposite end of the stretchable strip.

4. A method of securing a weight plate to a barbell, comprising:
    1) providing a stretchable strip having a first end and a second opposite end, a post on the first end, a plurality of apertures near the second opposite end, and a gripping flap at each of the first end and the second opposite end of the stretchable strip to facilitate stretching the stretchable strip around the barbell, wherein each of the gripping flaps are on one side of the stretchable strip and extend from the one side of the stretchable strip;
    2) gripping the gripping flap at the first end and gripping the gripping flap at the second opposite end of the stretchable strip;
    3) placing the first end with the post adjacent to the weight plate on the barbell, between the weight plate and an end of the barbell;
    4) wrapping the second opposite end around a circumference of the barbell so that the second opposite end engages the post on the first end;
    5) stretching the stretchable strip until a desired aperture of the plurality of apertures reaches the post; and
    6) inserting the post into the desired aperture of the plurality of apertures to form a circular collar to secure the weight plate to the barbell so that the weight plate does not fall off the end of the barbell wherein stretching the stretchable strip around the barbell with each of the gripping flaps creates a high resistance to movement of the stretchable strip along a length of the barbell.

5. The method of claim 4, wherein the gripping flap on the first end and the gripping flap on the second opposite end are oriented perpendicular to a longitudinal segment of the stretchable strip the strip extending between the first end and the second opposite end of the stretchable strip.

* * * * *